United States Patent
Walenty et al.

(10) Patent No.: US 6,895,322 B2
(45) Date of Patent: May 17, 2005

(54) ANTI-LOCK BRAKE CONTROL METHOD HAVING ADAPTIVE ENTRY CRITERIA

(75) Inventors: Allen John Walenty, Macomb, MI (US); Kevin Gerard Leppek, Rochester Hills, MI (US); David Alan Thatcher, Troy, MI (US)

(73) Assignee: General Motors Corporation, Detroit, MI (US)

( * ) Notice: Subject to any disclaimer, the term of this patent is extended or adjusted under 35 U.S.C. 154(b) by 214 days.

(21) Appl. No.: 09/976,887

(22) Filed: Oct. 15, 2001

(65) Prior Publication Data

US 2003/0074126 A1 Apr. 17, 2003

(51) Int. Cl.[7] .......................... G06F 19/00; B60B 39/00; G05D 1/00; B60T 8/72
(52) U.S. Cl. ............................. 701/71; 701/76; 701/79; 701/70; 303/176; 303/194
(58) Field of Search ............................. 701/71, 76, 79, 701/74, 70, 77; 303/122.06, 176, 194

(56) References Cited

U.S. PATENT DOCUMENTS 5,431,488 A * 7/1995 DeVore .................. 303/122.06
6,120,110 A * 9/2000 Shimizu .................. 303/113.4
6,490,518 B1 * 12/2002 Walenty et al. ............... 701/71

* cited by examiner

*Primary Examiner*—Thomas G. Black
*Assistant Examiner*—Brian J. Broadhead
(74) *Attorney, Agent, or Firm*—Christopher DeVries (57) ABSTRACT

An improved ABS control method incorporates entry criteria for initiating ABS control based on brake pedal position and rate of depression, adaptively adjusted by a reference pedal position corresponding to a predefined vehicle deceleration. A periodically-updated characterization of the relationship between brake pedal position and vehicle deceleration is used to establish the reference brake pedal position, and when insipient wheel lock is detected, the initiation of ABS control is delayed by an entry delay period that decreases with increasing rate of pedal depression and with the degree to which the pedal position exceeds the reference pedal position. In this way, the entry conditions are predicated primarily on the manner of brake pedal depression, with adaptive adjustment for variations in braking effectiveness.

7 Claims, 6 Drawing Sheets

ANTI-LOCK BRAKE CONTROL METHOD HAVING ADAPTIVE ENTRY CRITERIA

TECHNICAL FIELD

This invention relates to motor vehicle anti-lock brake systems, and more particularly to a control method that adaptively determines entry criteria for initiating anti-lock brake control.

BACKGROUND OF THE INVENTION

A motor vehicle anti-lock braking system (referred to herein as an ABS system) repeatedly releases and re-applies hydraulic brake pressures during conditions of wheel lock to maximize the tractive force between the vehicle tires and the road surface. The pressure control is highly effective under most wheel lock conditions (referred to herein as "true ABS conditions"), but can actually extend the vehicle stopping distance under conditions where the wheel lock occurs due to wheel-hop when braking on a bumpy road surface. For this reason, most ABS systems not only detect insipient wheel lock, but also attempt to distinguish between true ABS conditions and wheel-hop conditions, so that ABS control is only initiated under true ABS conditions. A common method of distinguishing between true ABS conditions and wheel-hop conditions involves delaying the initiation of ABS control for a delay time; for example, the delay time may be determined based on vehicle deceleration so that a maximum delay occurs at low vehicle deceleration and a minimum delay occurs at high vehicle deceleration. However, it is difficult to reliably distinguish between true ABS conditions and wheel-hop conditions with such methods; for example, a similar response can occur for both a wheel-hop condition and a true ABS condition on a low coefficient of friction road surface. Accordingly, what is needed is a method of entering ABS control that reliably distinguishes between true ABS conditions and wheel-hop conditions, and that initiates ABS control without unnecessary delay under true ABS conditions.

SUMMARY OF THE INVENTION

The present invention is directed to an improved ABS control method in which entry criteria for initiating ABS control are determined based on brake pedal position and rate of depression, and adaptively adjusted by determining a reference pedal position corresponding to a predefined vehicle deceleration. A periodically-updated characterization of the relationship between brake pedal position and vehicle deceleration is used to establish the reference brake pedal position, and when insipient wheel lock is detected, the initiation of ABS control is delayed by an entry delay period that decreases with increasing rate of pedal depression and with the degree to which the pedal position exceeds the reference pedal position. In this way, the entry conditions are predicated primarily on the manner of brake pedal depression, with adaptive adjustment for variations in braking effectiveness.

DESCRIPTION OF THE PREFERRED EMBODIMENT

Figure 1:
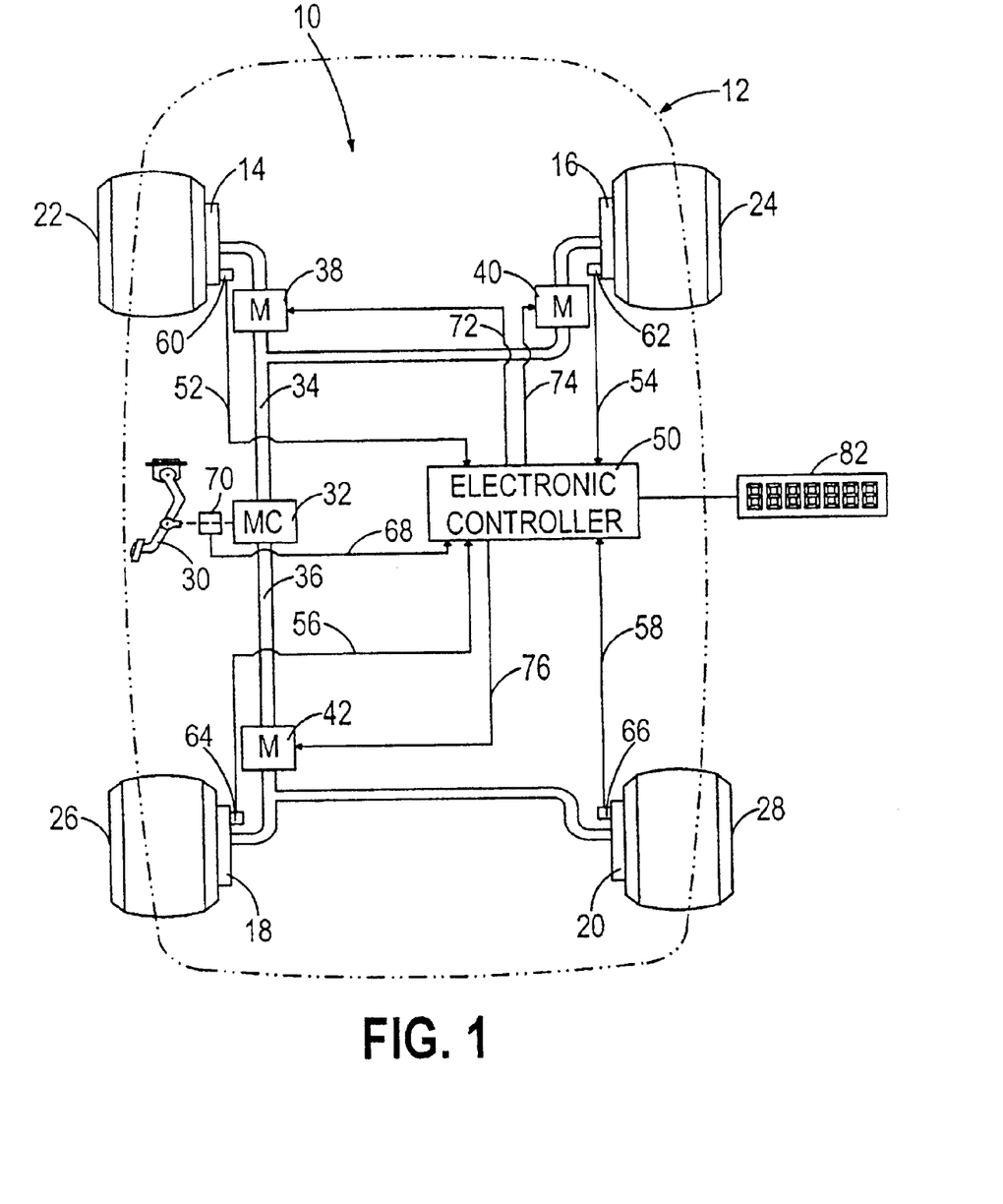
FIG. 1 is a schematic diagram of a vehicle ABS system, including a brake pedal position sensor, and a microprocessor-based control unit programmed to carry out the method of this invention.

Referring to FIG. 1, the present invention is disclosed in the context of an ABS system 10 for a vehicle 12 having hydraulically-activated friction brakes 14, 16, 18, 20 at each of four vehicle wheels 22, 24, 26, 28. A driver-manipulated brake pedal 30 is mechanically coupled to a master cylinder (MC) 32 for producing hydraulic pressure in proportion to the force applied to pedal 30. Master cylinder 32, which may include a pneumatic booster (not shown), proportions the hydraulic pressure between front and rear brake supply lines 34 and 36 in a conventional manner. Front supply line 34 is coupled to the left front service brake 14 via left-front ABS modulator (M) 38, and to the right front service brake 16 via right-front ABS modulator (M) 40. Rear supply line 36 is coupled to the left and right rear wheel brakes 18, 20 via rear ABS modulator (M) 42.

A microprocessor-based control unit 50 receives various inputs, including wheel speed signals on lines 52, 54, 56, 58 from respective wheel speed sensors 60, 62, 64, 66 and a brake pedal position signal PP on line 68 from pedal position sensor 70. The sensors 60, 62, 64, 66 and 70 may be implemented with conventional devices in a manner known to those skilled in the art. In response to the various inputs, the control unit 50 outputs modulator control signals on lines 72, 74, 76 during wheel lock-up conditions, and diagnostic information signals on line 80 for display on a driver information device 82.

In general, the control unit 50 monitors the measured wheel speeds to detect a condition of insipient wheel lock, and after a delay interval, controls modulators 38, 40, 42 to repeatedly release and re-apply the respective hydraulic brake pressures to maximize the tractive force between the vehicle tires and the road surface. In a conventional system, the delay interval is scheduled as a function of vehicle deceleration, and is intended to distinguish between true ABS conditions and wheel-hop conditions, so that ABS control is only initiated under true ABS conditions. However, it is difficult to reliably distinguish between true ABS conditions and wheel-hop conditions with a simple delay interval, and a similar response can occur for both a wheel-hop condition and a true ABS condition on a low coefficient of friction road surface, for example. This issue is addressed by the present invention, which provides a control method that reliably distinguishes between true ABS conditions and wheel-hop conditions, and that initiates ABS control without unnecessary delay under true ABS conditions. According to the invention, entry criteria for initiating ABS control are determined based on brake pedal position (PP) and the brake apply rate (BAR), and adaptively adjusted by determining a reference pedal position (PP_REF) corresponding to a predefined vehicle deceleration. A periodically-updated characterization of the relationship between brake pedal position and vehicle deceleration (which may also be used for diagnostic purposes) is used to establish the reference brake pedal position, and when insipient wheel lock is detected, the initiation of ABS control is delayed by an entry delay period that decreases with increasing values of BAR and with the degree to which PP exceeds PP_REF. In this way, the entry conditions are predicated primarily on the manner of brake pedal depression, with adaptive adjustment for variations in braking effectiveness.

Figure 2:
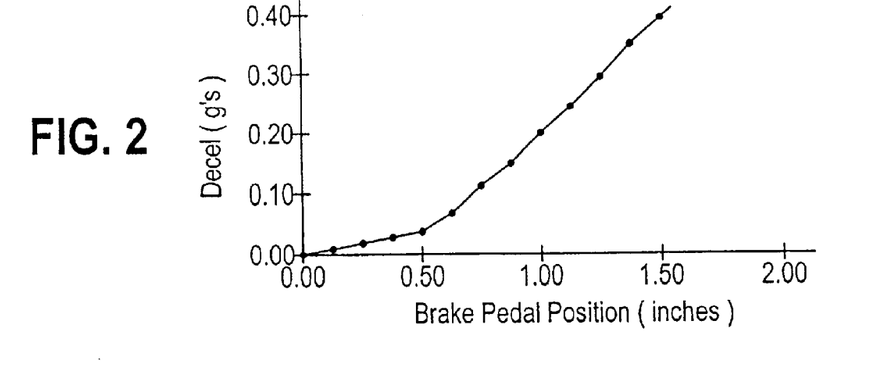
FIG. 2 is a graph depicting vehicle deceleration as a function of brake pedal position for the braking system of FIG. 1.
Figure 3:
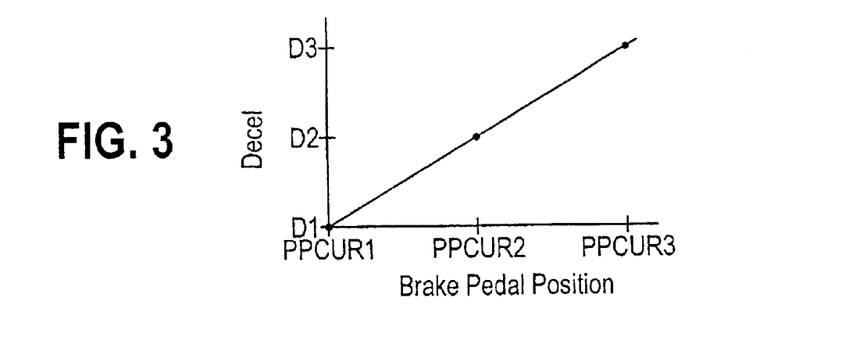
FIG. 3 is a graph depicting an exemplary brake system characterization according to this invention.

FIG. 2 graphically depicts a representative relationship between vehicle deceleration and brake pedal position for defined braking of the vehicle 12, assuming that there is no lock-up condition and the modulators 38, 40, 42 are inactive. Typically, the "knee" portion of the relationship varies considerably from stop to stop, whereas the portion of the relationship above the knee tends to be linear and repeatable from stop to stop. For this reason, the knee portion of the relationship is ignored for purposes of this invention, and the brake pedal position vs. vehicle deceleration relationship is characterized only for pedal positions and vehicle decelerations in the linear portion above the knee. In the illustrated embodiment, the characterization data is collected by identifying the pedal position values PPCUR1, PPCUR2 and PPCUR3 corresponding to three different vehicle deceleration values D1, D2 and D3, as illustrated in FIG. 3. Of course, any number of data points may be used, and the data points may be defined in terms of pedal position, if desired. In any case, the braking data is only collected during braking operation when the pedal 30 is depressed at a "normal" rate or held at an essentially static position; data is not collected upon release of the pedal 30 or during panic braking. This eliminates the need to compensate for the effects of suspension and powertrain dynamics, tire and sensor dynamics, and so on. The vehicle acceleration at the onset of braking is saved and subtracted from the deceleration during braking operation in order to compensate for the effects of engine braking and road grade. Of course, the road grade and other factors such as vehicle weight and the effects of brake heating may be estimated and used to compensate the collected braking data; see, for example, U.S. Pat. No. 6,212,458 to Walenty et al., issued on Apr. 3, 2001, and incorporated herein by reference. The characterization table is periodically updated to reflect a current condition of the braking effectiveness, and the reference pedal position PP_REF corresponding to a predefined vehicle deceleration such as 0.1 g (the deceleration obtainable on a very low coefficient of friction road surface) can be determined from the table, either directly or by interpolation.

According to the invention, a delay interval (ABS_ON) is determined based on PP_REF, PP and BAR, and ABS control is initiated if insipient wheel lock is detected and the delay interval (which may be zero) has elapsed. In the illustrated embodiment, a counter (ENTRY_CTR) is used to time an interval of continuously detected insipient wheel lock, and the delay interval is computed according to the expression:

$$ABS\_ON = Kdelay - [(PP-PP_{REF}) \cdot K1] - (BAR * Krate)$$

where Kdelay is a default delay interval such as 240 msec, and K1 and Krate are gain factors. The quantity [(PP−PP_REF)*K1] reduces the delay interval in proportion to the degree to which the pedal position PP exceeds the reference position PP_REF, and the quantity (BAR*Krate) further reduces the delay interval in proportion to the brake pedal apply rate BAR. The gain term K1 may be chosen to reduce ABS_ON to zero (for no delay) if the difference (PP−PP_REF) reaches a calibrated value, and the gain term Krate may be chosen to reduce ABS_ON to zero if BAR is equal to a calibrated value. Also, if the effectiveness of braking system 10 is degraded, due to brake wear, for example, PP_REF increases to adaptively adjust ABS_ON.

Figure 4:
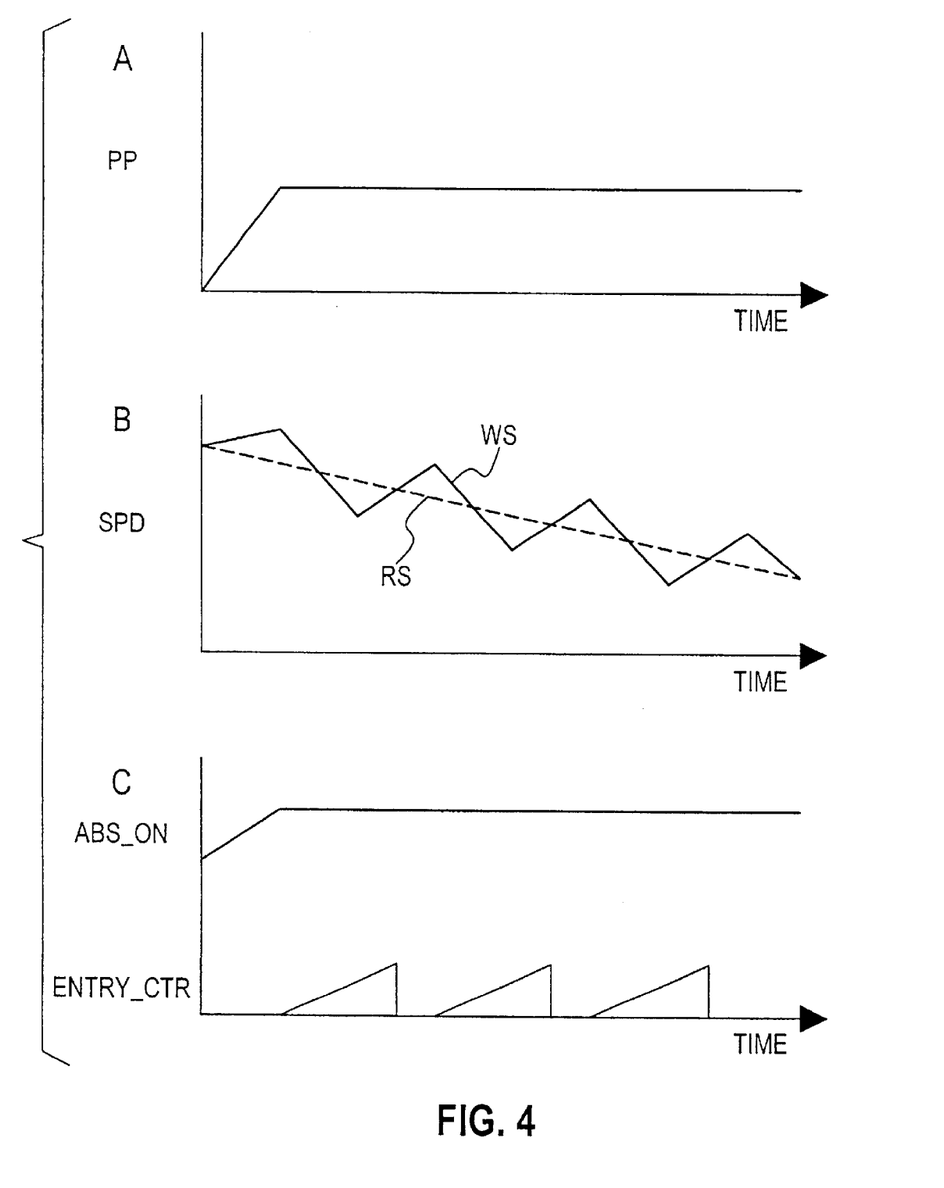
FIG. 4, Graphs A–C, illustrate the method of this invention during a brake event on a bumpy road surface.

In a true ABS condition, detected by significant brake pedal depression and/or high brake application rate, the delay interval ABS_ON is reduced to zero or near-zero for immediate initiation of ABS control upon detection of insipient wheel-lock. In a wheel-hop condition, on the other hand, the brake pedal depression rate and pedal position are relatively low, and ABS control is initiated when insipient wheel lock is detected and ENTRY_CTR reaches ABS_ON. In a severe wheel-hop condition, insipient wheel lock is cyclically set and reset as the vehicle wheel(s) accelerate and decelerate, keeping the counter ENTRY_CTR below ABS_ON so that ABS control is not initiated. An example of this situation is depicted by Graphs A–C of FIG. 4; Graph A depicts PP, Graph B depicts a wheel speed WS and the vehicle reference speed RS, and Graph C depicts ABS_ON and ENTRY_CTR, all on a common time base. In the illustrated example, the relatively modest brake pedal depression produces a corresponding delay interval ABS_ON, and counter ENTRY_CTR begins counting each time the wheel speed WS falls below the vehicle reference speed RS, and is reset each time the wheel speed WS rises above the reference speed RS. Although insipient wheel lock is cyclically detected, ENTRY_CTR remains below ABS_ON, and ABS control is not initiated.

Figure 5:
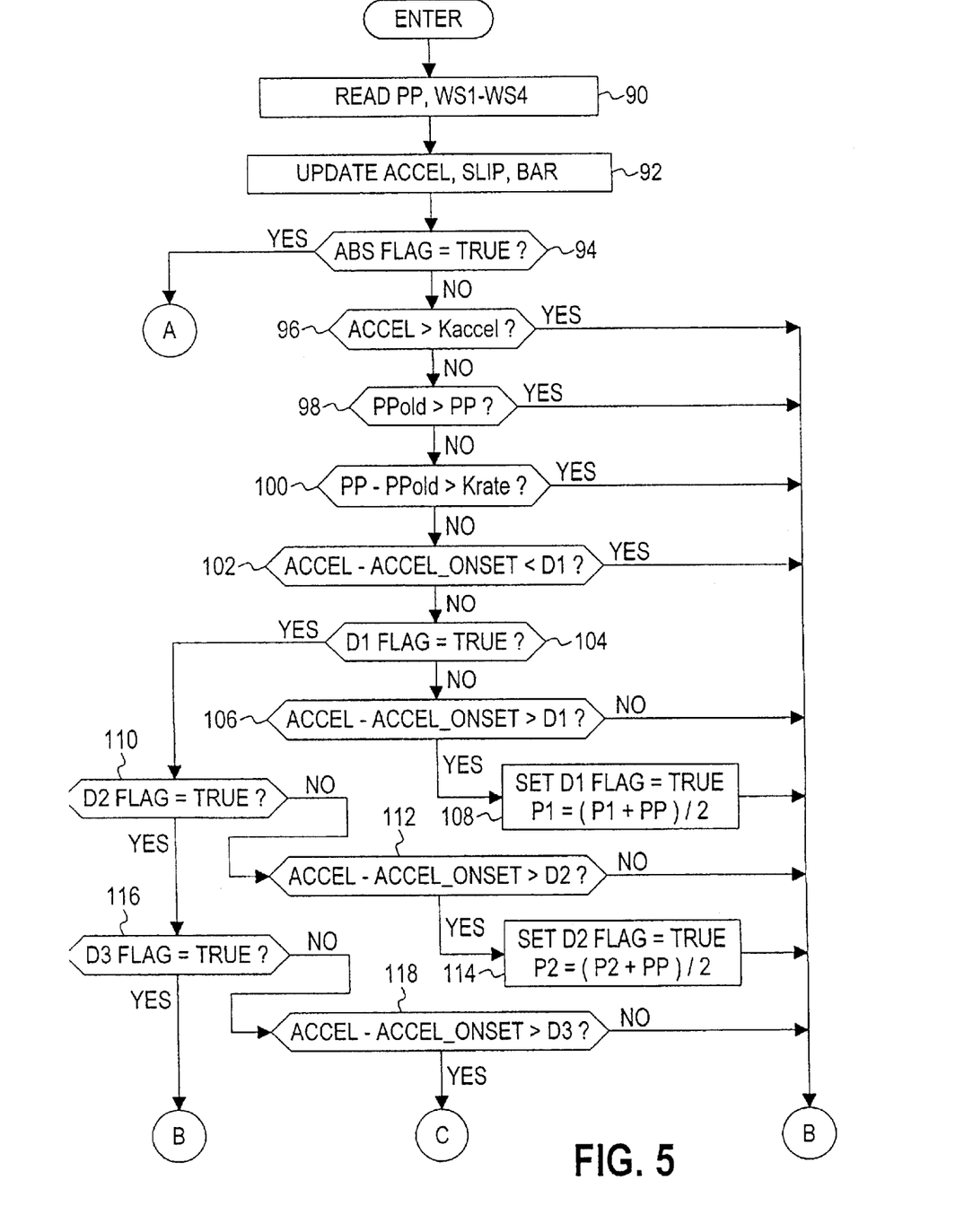
FIGS. 5–7 depict a computer software routine periodically executed by the control unit of FIG. 1 for carrying out the control method of this invention.
Figure 6:
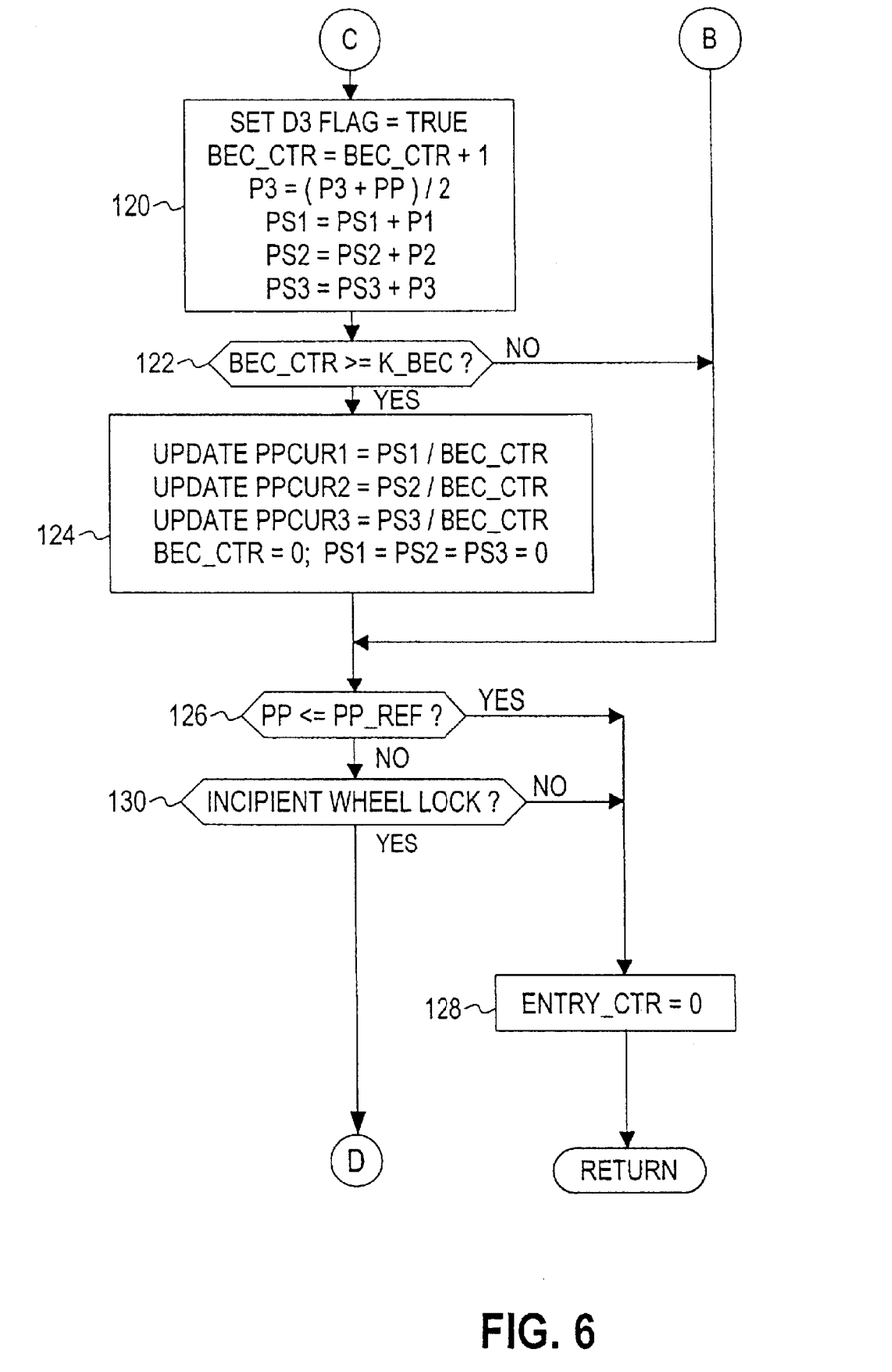
Figure 7:
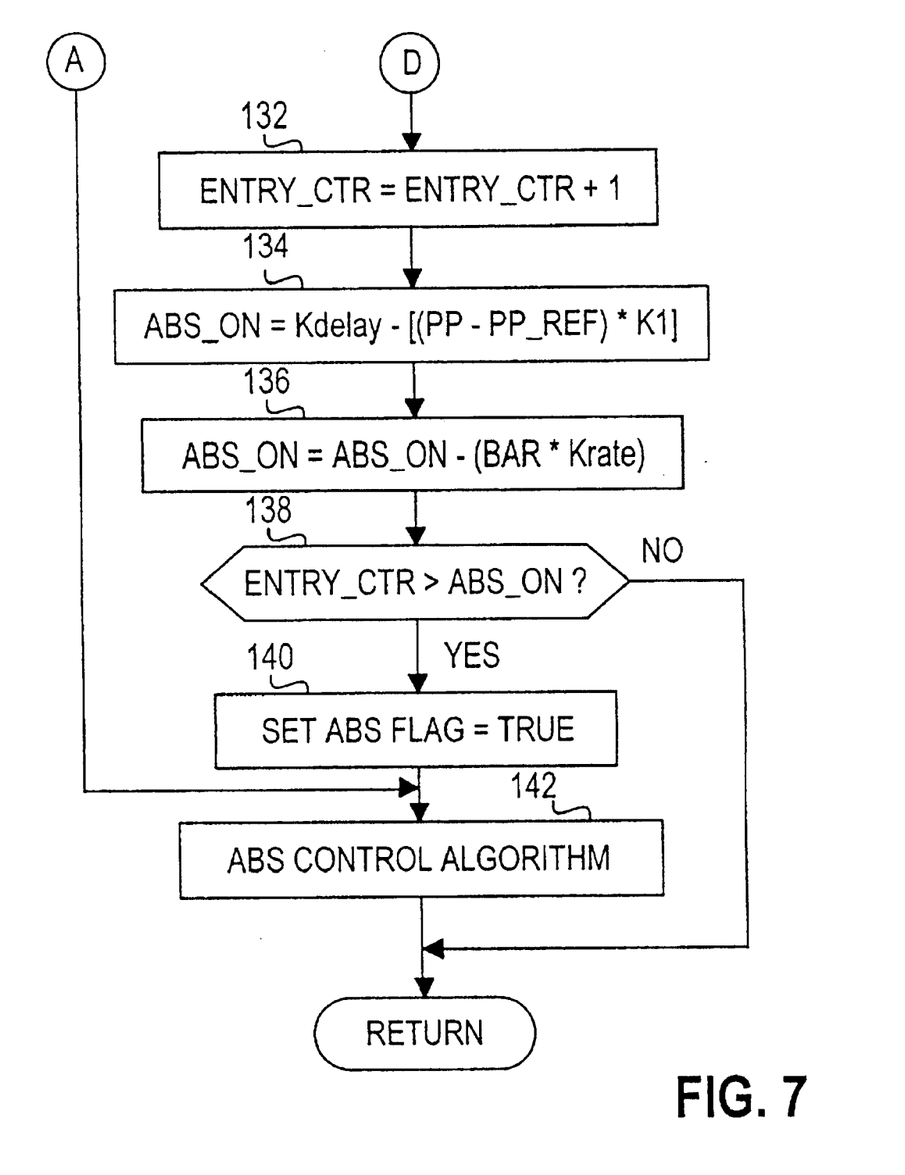

The method of the invention is illustrated by the flow diagram of FIGS. 5–7, which represents a software routine periodically executed by control unit 50 of FIG. 1. The routine serves to collect the braking system characterization data, and to determine if the adaptive ABS entry criteria are met. Referring to FIG. 5, the input processing blocks 90 and 92 are first executed to read the brake pedal position PP and the wheel speeds (WS1–WS4), to compute the vehicle acceleration ACCEL (compensated for road grade and vehicle weight), wheel slip and brake application rate BAR. Also, the vehicle acceleration when the brake pedal 30 is initially depressed is saved as the onset acceleration ACCEL_ONSET. Block 94 then checks the ABS FLAG to determine if ABS control is active. Ordinarily, the ABS FLAG is FALSE, and a portion of the routine comprising the blocks 96–124 is executed to collect braking system characterization data. If insipient wheel lock has been detected, and the modulators 38, 40, 42 have been activated to release brake pressure, the ABS FLAG will be TRUE; in this case, the data collection portion of the routine is skipped, and the block 142 is executed to carry out a conventional ABS control algorithm. If block 94 is answered in the negative, the data collection portion of the routine (blocks 96–102) is executed to detect the presence of braking activity that is suitable for brake system characterization. Block 96 determines if ACCEL exceeds a relatively high threshold acceleration Kaccel, block 98 determines if the previous pedal position PPold is greater than the current value PP, block 100 determines if the difference (PP−PPold) exceeds a threshold rate Krate, and block 102 determines if the difference (ACCEL−ACCEL_ONSET) is less than the minimum deceleration table entry D1. Each of the blocks 96, 98, 100, 102 must be answered in the negative to proceed with data collection; thus, a "normal" braking condition is defined as one in which (1) ACCEL <Kaccel, (2) PPold<PP, (3) PP−PPold<Krate, and (4) ACCEL−ACCEL_ONSET>D1. Stated oppositely, "normal" braking for purposes of data collection does not include (1) panic braking, (2) high rate brake pedal movement, (3) brake pedal releasing, or (4) deceleration below the linear range of the deceleration vs. pedal position relationship. If at least one of the blocks 96, 98, 100, 102 is answered in the affirmative, the blocks 104–124 are skipped, and the control unit 50 proceeds to block 126, as indicated by the circled letter B.

The data collection blocks 104–124 identify the brake pedal positions P1, P2, P3 corresponding to the respective predefined vehicle deceleration values D1, D2, D3, and periodically update a brake system characterization table corresponding to the graph of FIG. 3. The blocks 104, 110 and 116 respectively determine if the pedal positions P1, P2 and P3 have been identified, based on the status of the D1 FLAG, the D3 FLAG. If block 104 determines that the D1 FLAG is not true, the block 106 determines if the difference (ACCEL−ACCEL_ONSET) has reached the predefined deceleration value identified in FIG. 3 as D1. If not, the data collection portion of the routine is exited; if so, the block 108 sets the D1 FLAG to true, and uses the current value of PP to update the pedal position variable P1 as shown. On the next execution of the routine, block 106 will be answered in the affirmative, and block 110 will determine if the D2 FLAG is true. If not, the block 112 determines if the difference (ACCEL−ACCEL_ONSET) has reached the predefined deceleration value identified in FIG. 3 as D2. If not, the data collection portion of the routine is exited; if so, the block 114 sets the D2 FLAG to true, and uses the current value of PP to update the pedal position variable P2 as shown. On the next execution of the routine, blocks 106 and 110 will both be answered in the affirmative, and block 116 will determine if the D3 FLAG is true. If not, the block 118 determines if the difference (ACCEL−ACCEL_ONSET) has reached the predefined deceleration value identified in FIG. 3 as D3. If not, the data collection portion of the routine is exited; if so, the block 120 sets the D3 FLAG to true, uses the current value of PP to update the pedal position variable P3, increments a brake event counter BEC_CTR, and sums the pedal position variables P1, P2 and P3 with corresponding position summation values PS1, PS2 and PS3. However, if the difference (ACCEL−ACCEL_ONSET) for the braking event fails to reach the deceleration value D3, the block 120 is not executed, and any pedal position data collected during the respective brake application is discarded.

After each successful data collection, the block 122 compares the brake event counter BEC_CTR to a calibrated threshold K_BEC indicative of the number of braking events needed to update the braking system characterization table. Thus, when BEC_CTR reaches K_BEC, the identified pedal position variables P1, P2, P3 for K_BEC (which may have a value of ten, for example) braking events will have been accumulated in the respective position summation values PS1, PS2, PS3. When this happens, the block 124 re-calculates the braking system characterization table values PPCUR1, PPCUR2, PPCUR3 by dividing the respective pedal position summation values PS1, PS2, PS3 by the brake event counter BEC_CTR. In other words, PPCUR1=PS1/BEC_CTR, PPCUR2=PS2/BEC_CTR and PPCUR3=PS3/BEC_CTR. Block 124 also resets the brake event counter BEC_CTR and the position summation values PS1, PS2, PS3 to zero.

Once the data collection portion of the routine has been completed or exited, the block 126 is executed to determine if the brake pedal position PP is less than the reference pedal position PP_REF. As indicated above, PP_REF is a pedal position from the brake characterization table corresponding to a vehicle deceleration such as 0.1 g. If so, the block 128 is executed to reset ENTRY_CTR to zero. If not, the block 130 checks for insipient wheel lock. If insipient wheel lock is not detected, the block 128 is executed to reset ENTRY_CTR to zero; if insipient wheel lock is detected, the blocks 132, 134 and 136 are executed to increment ENTRY_CTR and to compute the delay interval ABS_ON. If ENTRY_CTR exceeds ABS_ON, as determined at block 138, the blocks 140 and 142 are executed to set the ABS FLAG to TRUE, and to initiate the ABS control algorithm. If ENTRY_CTR is less than ABS_ON, the blocks 140 and 142 are skipped, and ABS control is not initiated.

In summary, the control of this invention provides a reliable and cost-effective way of adaptively adjusting the entry criteria for an ABS system based on the brake pedal position and depression rate, using brake system characterization data to adaptively adjust the entry criteria for degradation of braking effectiveness. While the brake system characterization table is depicted as being developed for purposes of determining PP_REF, it may be also be advantageously used for diagnosing brake system abnormalities, as described in detail in the U.S. Ser. No. 09/885,191 filed Jun. 21, 2001. While described in reference to the illustrated embodiment, it is expected that various modifications in addition to those mentioned above will occur to those skilled in the art. For example, the control is applicable to other types of ABS systems, and other types of vehicles, including electric or hybrid vehicles that utilize electric or regenerative braking to decelerate the vehicle. Thus, it will be understood that the scope of this invention is not limited to the illustrated embodiment, and that control methods incorporating these and other modifications may fall within the scope of this invention, which is defined by the appended claims.

What is claimed is:

1. A method of operation for a vehicle braking system including a driver-manipulated brake pedal and an ABS system effective when activated to modulate a braking effort of the braking system, the method comprising the steps of:

measuring a position of the brake pedal using a brake pedal position sensor and determining a rate of change in brake pedal movement when the driver is depressing the brake pedal;

determining a delay interval based on the measured brake pedal position and the determined rate of change;

detecting a condition of insipient wheel lock, and measuring an interval of continuous insipient wheel lock detection; and activating the ABS system when the measured interval reaches the determined delay interval.

2. The method of claim 1, wherein the delay interval decreases with increases in the determined rate of change in brake pedal movement.

3. The method of claim 2, wherein the delay interval is decreased to a minimum value when the determined rate of change in brake pedal movement is at least a predetermined rate.

4. The method of claim 1. including the steps of:

determining a reference brake pedal position that produces a predefined vehicle deceleration without activation of said ABS system; and decreasing said delay interval in relation to an amount by which the measured brake pedal position exceeds the reference brake pedal position.

5. The method of claim 4, wherein the delay interval is decreased to a minimum value when the measured brake pedal position exceeds the reference brake pedal position by at least a predetermined amount.

6. A method of operation for a vehicle braking system including a driver-manipulated brake pedal and an ABS system effective when activated to modulate a braking effort of the braking system, the method comprising the steps of:

measuring a position of the brake pedal using a brake pedal position sensor and determining a rate of change in brake pedal movement when the driver is depressing the brake pedal;

determining a reference brake pedal position that produces a predefined vehicle deceleration without activation of said ABS system;

determining a delay interval based on the determined rate of change and an amount by which the measured brake pedal position exceeds the reference brake pedal position;

detecting a condition of insipient wheel lock, and measuring an interval of continuous insipient wheel lock detection; and activating the ABS system when the measured interval reaches the determined delay interval.

7. The method of claim 6, including the steps of:

periodically incrementing a count while insipient wheel lock is detected to measure said interval of continuous insipient wheel lock detection;

resetting said count when insipient wheel lock is not detected; and resetting said count when the measured brake pedal position is less than said reference brake pedal position.

* * * * *